US006690196B1

(12) United States Patent
Cecchi et al.

(10) Patent No.: US 6,690,196 B1
(45) Date of Patent: Feb. 10, 2004

(54) SIMULTANEOUS BI-DIRECTIONAL I/O SYSTEM

(75) Inventors: Delbert R. Cecchi, Rochester, MN (US); Daniel N. De Araujo, Cedar Park, TX (US); Daniel M. Dreps, Georgetown, TX (US); John S. Mitby, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 10/216,617

(22) Filed: Aug. 8, 2002

(51) Int. Cl.[7] .......................................... H03K 19/0175
(52) U.S. Cl. .............................. 326/82; 326/30; 326/86; 326/90
(58) Field of Search .............................. 326/30, 82, 83, 326/86, 90

(56) References Cited

U.S. PATENT DOCUMENTS

| 5,568,064 A | 10/1996 | Beers et al. | 326/31 |
| 5,578,939 A | 11/1996 | Beers et al. | 326/30 |
| 5,760,601 A | 6/1998 | Frankeny | 326/30 |
| 5,793,223 A | 8/1998 | Frankeny | 326/30 |
| 5,815,107 A | 9/1998 | Frankeny et al. | 341/159 |
| 5,923,276 A | 7/1999 | Frankeny et al. | 341/155 |
| 5,949,982 A | 9/1999 | Frankeny et al. | 395/312 |
| 6,101,561 A | 8/2000 | Beers et al. | 710/66 |
| 6,304,106 B1 * | 10/2001 | Cecchi et al. | 326/86 |
| 6,597,198 B2 * | 7/2003 | Haycock et al. | 326/82 |

* cited by examiner

Primary Examiner—Michael Tokar
Assistant Examiner—Anh Tran
(74) Attorney, Agent, or Firm—Richard F. Frankeny; Winstead Sechrest & Minick P.C.; Casimer K. Salys

(57) ABSTRACT

A system for transmitting and receiving data between the near end to the far end of a transmission line. The system has simultaneous bi-directional (SBIDI) drivers and receivers for high performance over well behaved transmission lines. The SBIDI drivers and SBIDI receivers are enabled and disabled by logic inputs. A unidirectional (UNI) receiver is connected in parallel with each SBIDI receivers. Logic insures that the SBIDI and UNI receivers are not enabled at the same time. When desired, the SBIDI receivers are disabled and the UNI receivers enabled and signaling is done unidirectional. The current level in the SBIDI drivers may be modified in response to mode compensation signals to improve signal to noise in the unidirectional mode and to compensate for losses in the simultaneous bi-directional mode. The system may be integrated into all I/O's for maximum design flexibility.

22 Claims, 8 Drawing Sheets

SIMULTANEOUS BI-DIRECTIONAL I/O SYSTEM

TECHNICAL FIELD

The present invention relates in general to board level transmission line drivers and receivers, and in particular, to simultaneous bi-directional drivers and receivers that allow both ends of the line to transmit without protocol.

BACKGROUND INFORMATION

Digital computer systems have a history of continually increasing the speed of the processors used in the system. As computer systems have migrated towards multiprocessor systems, sharing information between processors and memory systems has also generated a requirement for increased speed for the off-chip communication networks. Designers usually have more control over on-chip communication paths than for off-chip communication paths. Off-chip communication paths are longer, have higher noise, impedance mismatches and have more discontinuities than on-chip communication paths. Since off-chip communication paths are of lower impedance, they require more current and thus more power to drive.

In an attempt to increase the bandwidth and in some cases simplify the protocol of off-chip networks, designers have incorporated simultaneous bi-directional (SBIDI) communication drivers and receivers. In SBIDI data transmission, data may be transmitted from each end of a transmission line simultaneously much like a full duplex telephone network where both parties can talk at the same time. Since more than one binary source is transmitting, the signal on a transmission line must have more than two levels and the signal generally has three levels corresponding to when both sources are transmitting a zero, either source is transmitting a one, and both sources are transmitting a one. In a network with a limited voltage swing, this results in an expected reduction in signal levels for differentiating each particular data stream. This reduction in signal levels may also result in a reduction in the signal to noise ratio. However, the SBIDI systems are able to transmit twice the amount of data over the same transmission line. In a system with well controlled transmission lines, SBIDI signaling may be a good design choice.

Off-chip communication paths may have multiple discontinuities. A signal originating at an on-chip driver traverses one impedance path from the driver to the chip I/O, another impedance path from chip I/O to the chip carrier I/O and yet another path within a circuit board. To get to its final destination, an off-chip signal may also have to traverse connectors and then paths in the packaging of a receiving chip. At high speed off-chip communication frequencies, the reflections and noise couplings may reduce SBIDI signaling reliability. In this case, the designer may have to revert to unidirectional (UNI) signaling to get the higher signal swings and improved signal to noise ratio.

System designers like to have one type of off-chip communication circuitry that may be used in a variety of off-chip networks without having to design special drivers and receivers. Since there are times SBIDI when signaling is appropriate and other times when UNI signaling is appropriate, there is a need for a transceiver design for off-chip networks that allows the system designer to switch a transceiver from SBIDI to UNI depending on the quality of the network without having to re-wire to different circuitry.

SUMMARY OF THE INVENTION

A simultaneous bi-directional (SBIDI) driver has current source circuits for delivering controlled amounts of current to a transmission line depending on logic gating signals. The near end of the transmission line is connected to one SBIDI driver and the far end is connected to another SBIDI driver. The transmission line has near and far end terminators comprising two resistors connected in series across the transmission line with the common node of the series connection coupled to one half of the power supply voltage. A SBDI receiver has a comparator section which generates an output in response to the difference voltage on its positive and negative inputs. The positive input is generated as the output of a first summing network and the negative input is generated as the output of a second summing network. A SBDI receiver is coupled to the near and far ends of the transmission line.

An additional SBIDI driver is used at the near and far ends as a replica driver whose output is coupled to a resistor terminator network like the transmission line terminator. The first summing network of the SBIDI receivers is coupled to the positive side of the transmission line and the negative side of the output of the replica driver generating the sum of the corresponding two signals. The second summing network of the SBIDI receivers is coupled to the negative side of the transmission line and the positive side of the output of the replica driver generating the sum of the corresponding two signals. The near end SBIDI receiver subtracts the signal generated by the near end driver from the composite signal from the near and far end signals arriving at the near end resulting in the near end SBIDI receiver detecting the far end transmitted data. Likewise, the far end SBIDI receiver subtracts the signal generated by the far end driver from the composite signal from the near and far end signals arriving at the far end resulting in the far end SBIDI receiver detecting the near end transmitted data. Both the near and far end SBIDI drivers and replica drivers have enable signals which function to turn the SBIDI replica drivers OFF and selectively set the SBIDI driver outputs into a high impedance mode (tri-state).

Both the near and far ends of the transmission line have a unidirectional (UNI) receiver coupled to the transmission line. If the transmission line is such that the reliability of SBIDI signal transmission is questionable, the UNI mode may be enabled. In the UNI mode, the replica SBIDI drivers are gated OFF and the SBIDI drivers are selectively gated OFF and ON depending on which end of the transmission line is sending or receiving data. The SBIDI receivers are gated OFF when the UNI receivers are gated ON. In the UNI signal transmission mode, the magnitude of the current sources may be modulated by controlling how many of the current source circuits in each SBIDI driver is ON during a data bit cycle. The outputs of the SBIDI and UNI receivers are logic OR'ed together to generate the near end and far end detected data signals.

The present invention results in an electronically controllable driver/receiver system for data transmission lines that allows a designer to select the mode of operation best suited to the transmission line system while keeping one common circuit topology.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1A:
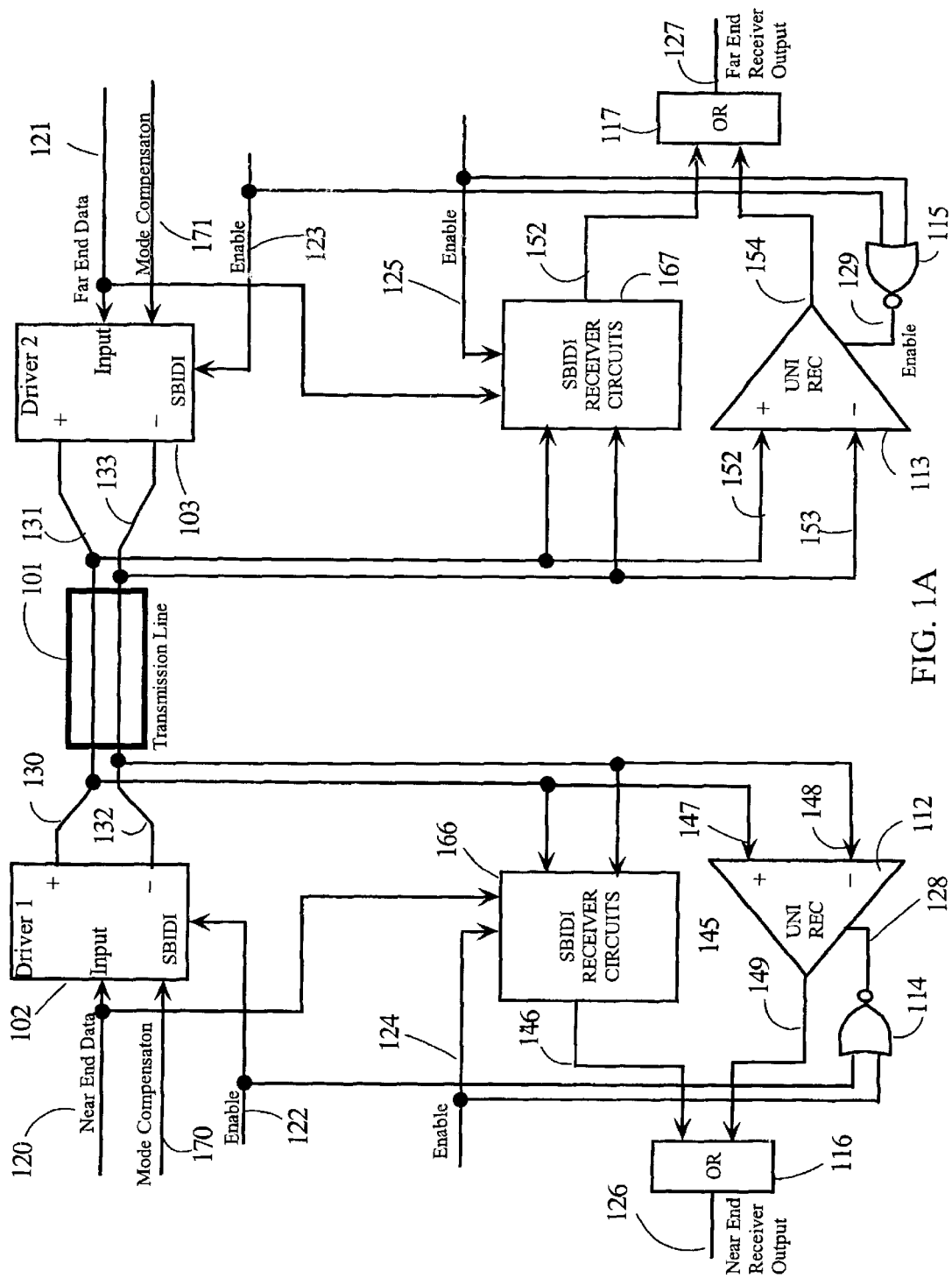
FIG. 1A is a high level circuit diagram of an embodiment of the present invention.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1A is a circuit diagram of one embodiment of the present invention. SBIDI driver 102 drives the near end of transmission line 101 and SBIDI driver 103 drives the far end of transmission line 101. Transmission line 101 is driven differentially with near end driver positive output (DPO) 130 and driver negative output (DNO) 132. Likewise, the far end of transmission line 101 is driven by DPO 131 and DNO 133. SBIDI driver 102 receives near end data signal 120 and is enabled by driver enable (DE) 122. SBIDI driver 103 receives far end data signal 121 and is enabled by DE 123. At any one time, during the SBIDI transmission mode, the voltage across DPO 130 and DNO 132 comprises the combination of the signal being transmitted by SBIDI driver 102 and the signal being received from SBIDI driver 103.

The near end SBDI receiver circuits 166 receive DPO 130, DNO 132, near end data 120 and generate receiver output (RO) 146. The near end SBDI receiver circuits 166 are enabled by receiver enable (RE) 124. Likewise, the far end SBDI receiver circuits 167 receive DPO 131, DNO 133, far end data 121 and generates RO 152. The far end SBDI receiver circuits 167 are enabled by RE 125.

DPO 130 and DNO 132 are also coupled to receiver positive input (RPI) 147 and receiver negative input (RNI) 148, respectively, of unidirectional receiver (UR) 112 which generates RO 149 as the amplified difference between RPI 147 and RNI 148. UR 112 is enabled by RE 128 which is the logic combination of DE 122 and RE 124 generated by logic NOR gate 114. The enable circuitry is configured so SBIDI receiver circuits 166 and UR 112 are not active at the same time. In the unidirectional (UNI) transmission mode, the SBIDI driver 102 is enabled and disabled depending on which end of transmission line 101 is transmitting or receiving data. When SBIDI driver 102 is disabled, DPO 130 and DNO 132 are set into a high impedance state (tri-state). Logic OR 116 receives RO 146 and RO 149 and generates RO 126 which comprises the data transmitted by far end SBIDI driver 103.

DPO 131 and DPN 133 are also coupled to RPI 152 and RNI 153, respectively, of UR 113 which generates RO 154 as the amplified difference between RPI 152 and RNI 153. UR 113 is enabled by RE 129 which is the logic combination of DE 123 and RE 125 generated by logic NOR gate 115. The enable circuitry is configured so SBIDI receiver circuits 167 and UR 113 are not active at the same time. In the unidirectional (UNI) transmission mode, the SBIDI driver 103 is enabled and disabled depending on which end of transmission line 101 is transmitting or receiving data. Likewise, when SBIDI driver 103 is disabled, DPO 131 and DNO 133 are set into a high impedance state (tri-state). Logic OR 117 receives RO 152 and RO 154 and generates RO 127 which comprises the data transmitted by near end SBIDI driver 102.

Figure 1B:
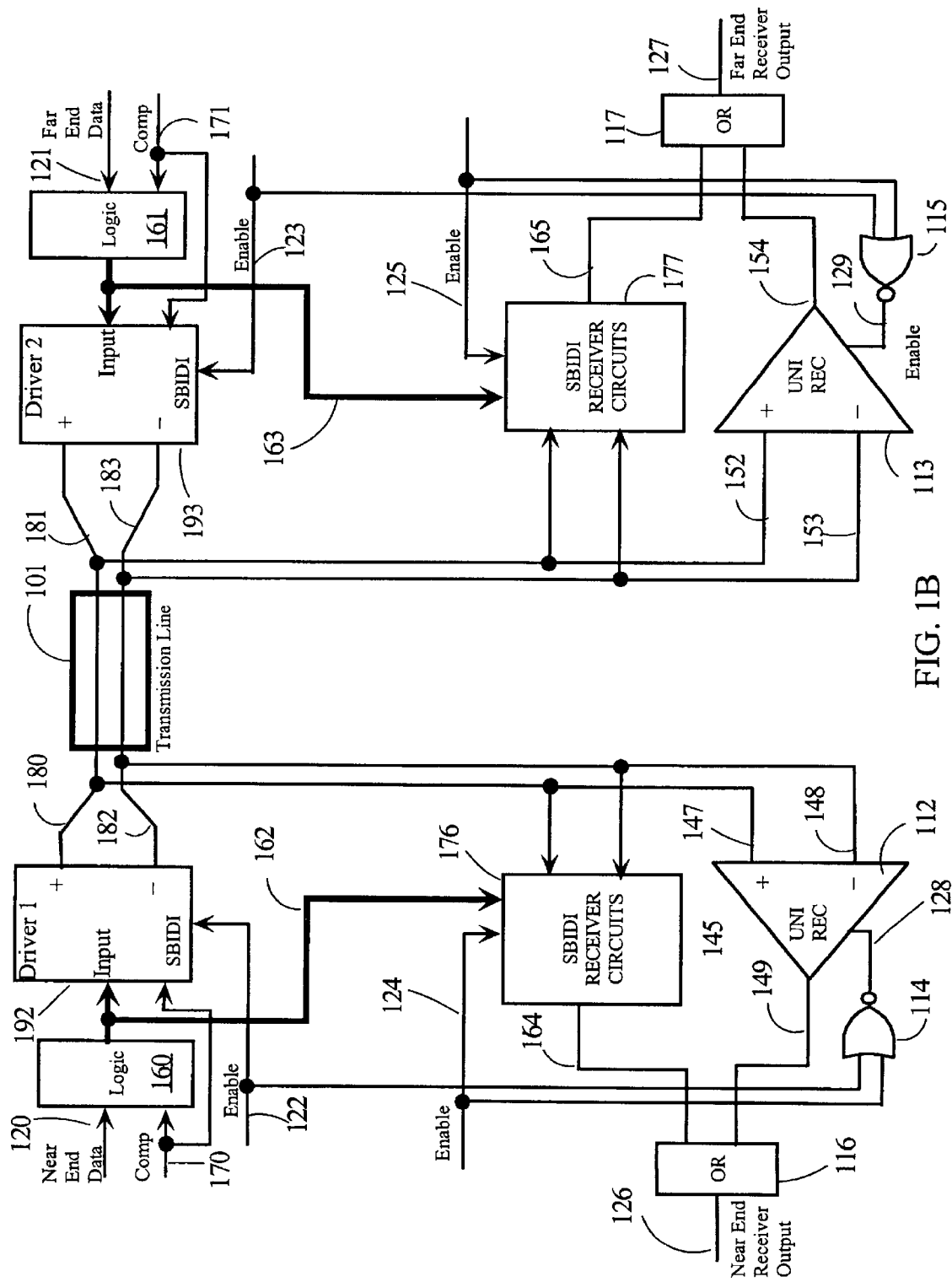
FIG. 1B is a high level circuit diagram of another embodiment of the present invention.

FIG. 1B is another embodiment of the present invention where the near end data signal 120 is received in a logic circuit 160. Logic circuit 160 receives near end data signal 120 and mode compensation signal 170 and generates a plurality of driver data signals 162. Driver data signals 162 may comprise two or more driver data signals generated by processing near end data signal 120 in response to logic states of mode compensation signal 170. Likewise, far end data signal 121 is received in a logic circuit 161 which is substantially the same as logic circuit 160. Logic circuit 161 receives far end data signal 121 and mode compensation signal 171 and generates a plurality of driver data signals 163. Driver data signals 163 comprise the same number of driver data signals 162 generated by corresponding logic circuit 160. Logic circuit 161 generates the driver data signals 163 by processing far end data signal 121 in response to logic states of mode compensation signal 171.

SBIDI receiver circuits 176 receive RE 124, the plurality of driver data signals 162, DPO 180, DNO 182, and generate RO 164 which comprises the data transmitted by far end SBIDI driver 193. SBIDI driver 192 generates a selected current level in response to the logic states of driver data signals 162. The logic state of mode compensation signal 170 may be modified (in system circuits not shown) depending on whether the SBIDI transmission mode or the UNI transmission mode is enabled. If the SBIDI mode is active in this embodiment, SBDI drivers 192 may be altered to compensate for transmission line losses by modifying a present transmitted current level as a function of previous logic states of the near end data signal 120. UR 112 is enabled by RE 128 which is the logic combination of DE 122 and RE 124 generated by logic NOR gate 114.

DPO 180 and DPN 182 are also coupled to receiver positive input (RPI) 147 and receiver negative input (RNI) 148, respectively, of unidirectional receiver (UR) 112 which generates RO 149 as the amplified difference between RPI 147 and RNI 148. UR 112 is enabled by RE 128 which is the logic combination of DE 122 and RE 124 generated by logic NOR gate 114. The enable circuitry is configured so SBIDI receiver circuits 166 and UR 112 are not active at the same time. In the unidirectional (UNI) transmission mode, the SBIDI driver 102 is enabled and disabled depending on which end of transmission line 101 is transmitting or receiving data. When SBIDI driver 102 is disabled, DPO 180 and DNO 182 are set into a high impedance state (tri-state).

SBIDI receiver circuits 177 receive RE 125, the plurality of driver data signals 163, DPO 181, DNO 183, and generate RO 165 which comprises the data transmitted by near end SBIDI driver 192. SBIDI driver 193 generates a selected current level in response to the logic states of driver data signals 163. The logic state of mode compensation signal 171 may be modified (in system circuits not shown) depending on whether the SBIDI transmission mode or the UNI transmission mode is enabled. If the SBIDI mode is active in this embodiment, SBDI drivers 193 may be altered to compensate for transmission line losses by modifying a present transmitted current level as a function of previous logic states of the far end data signal 121.

DPO 181 and DPN 183 are also coupled to RPI 152 and RNI 153, respectively, of UR 113 which generates RO 154 as the amplified difference between RPI 152 and RNI 153. UR 113 is enabled by RE 129 which is the logic combination of DE 123 and RE 125 generated by logic NOR gate 115. The enable circuitry is configured so SBIDI receiver circuits 167 and UR 113 are not active at the same time. In the unidirectional (UNI) transmission mode, the SBIDI driver 103 is enabled and disabled depending on which end of transmission line 101 is transmitting or receiving data. Likewise, when SBIDI driver 103 is disabled, DPO 181 and DNO 183 are set into a high impedance state (tri-state).

Similarly to the embodiment in FIG. 1A, logic circuit 116 receives RO 164 of SBIDI circuits 176 and RO 149 of UR 112 and generates received far end data on RO 126. For the far end, logic circuit 117 receives RO 165 of SBIDI circuits 177 and RO 154 of UR 113 and generates received near end data on RO 127.

Figure 1C:
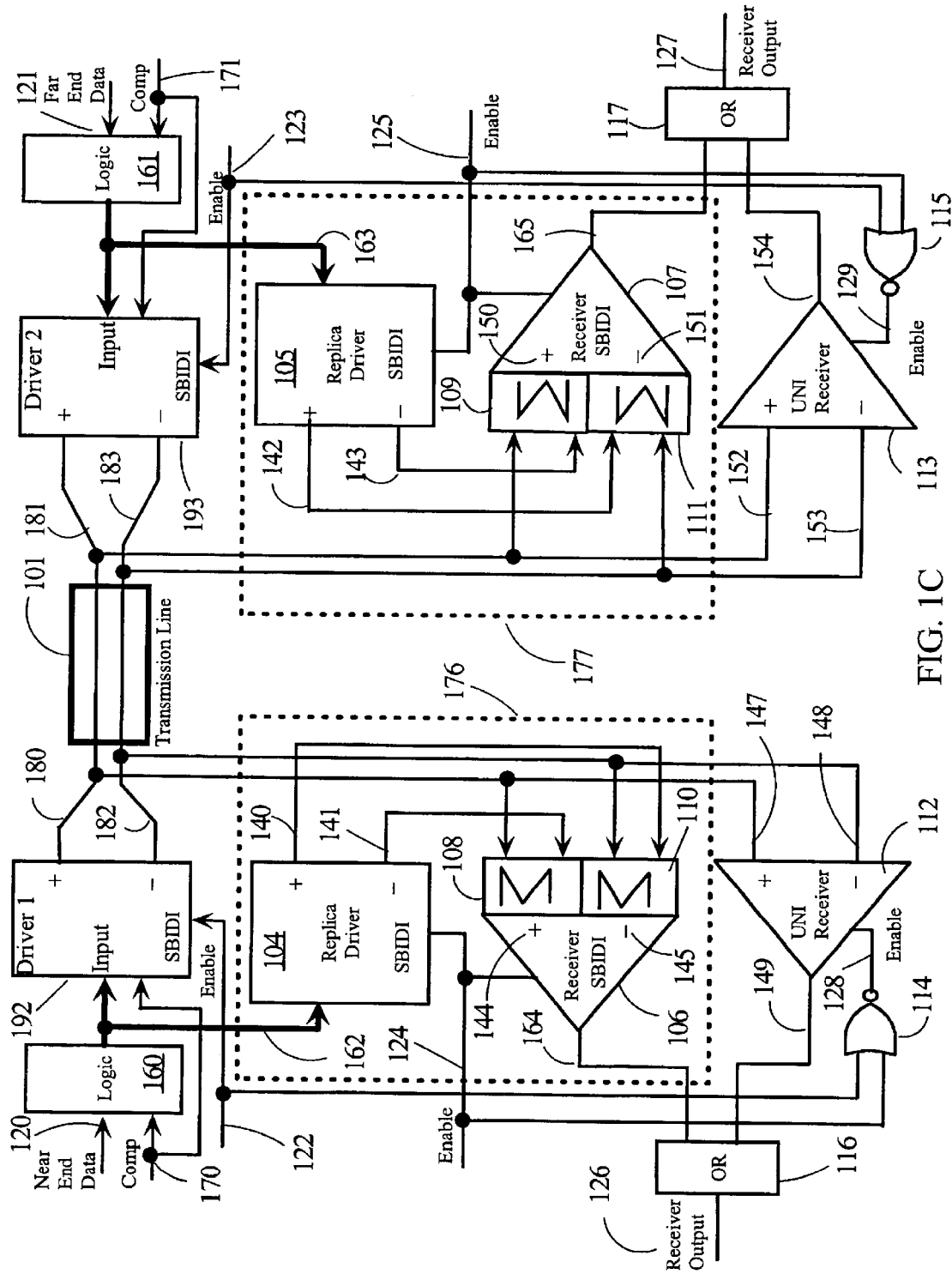
FIG. 1C a is detailed circuit diagram of the embodiment of FIG. 1B.

FIG. 1C is a more detailed circuit diagram of the embodiment of the present invention of FIG. 1B. SBIDI driver 192 drives the near end of transmission line 101 and SBIDI driver 193 drives the far end of transmission line 101. Transmission line 101 is driven differentially with near end driver positive output (DPO) 180 and driver negative output (DNO) 182. Likewise, the far end of transmission line 101 is driven by DPO 181 and DNO 183. Logic circuit 160 receives near end data signal 120 and generates driver data signals 162. SBIDI driver 192 receives driver data signals 162 and is enabled by DE 122. Logic circuit 161 receives far end data signal 121 and generates driver data signals 163. SBIDI driver 193 receives driver data signals 163 and is enabled by DE 123. At any one time, during the SBIDI transmission mode, the voltage across DPO 180 and DNO 182 comprises the combination of the signal being transmitted by SBIDI driver 192 and the signal being received from SBIDI driver 193. Replica Driver 104 is substantially the same as SBIDI driver 192 and receives driver data signals 162 and generates a replica positive output (RPPO) 140 and replica negative output (RPNO) 141 which closely matches the outputs generated by SBIDI driver 192 when it is driving the near end of transmission line 101. Similarly, Replica Driver 105 generates a signal at RPPO 142 and RPNO 143 which closely matches the outputs generated by SBIDI Driver 193 when it is driving the far end of transmission line 101. Replica Driver 104 is enabled by RE 124 and replica Driver 105 is enabled by RE 125. Near end SBIDI receiver 106 is also enabled by RE 124 insuring that the SBIDI receiver 106 is enabled when replica Driver 104 is enabled. Likewise, far end SBIDI receiver 107 is also enabled by the RE 125 insuring that the SBIDI receiver 107 is enabled when replica Driver 105 is enabled.

SBIDI receiver 106 has a receiver positive input RPI 144 and a receiver negative input (RNI) 145 and generates receiver output RO 164 in response to the difference in its inputs RPI 144 and RNI 145. RPI 144 is generated by summing circuit 108 as the summation of DPO 180 and RNO 141. Similarly, RNI 145 is generated by summing circuit 110 as the summation of DNO 182 and RPO 140. Therefore, the voltage at RPI 144 is equal to (DPO 180+RNO 141) and the voltage at the RNI 145 is equal to (DPN 182+RPO 140). SBIDI receiver 106 then generates receiver output (RO) 164 proportional to [(DPO 180–DNO 182)–(RPO 140–RNO 141)]. Since the portion of (DPO 180–DNO 182) attributed to the near end SBIDI driver 102 is essentially equal to (RPO 140–RNO 141), RO 164 is substantially only a function of the signal attributed to far end SBIDI driver 193.

DPO 180 and DPN 182 are also coupled to RPI 147 and RNI 148, respectively, of unidirectional receiver UR 112 which generates RO 149 as the amplified difference between RPI 147 and RNI 148. UR 112 is enabled by RE 128 which is the logic combination of DE 122 and RE 124 generated by logic NOR 114. The enable circuitry is configured so SBIDI receiver 106 and UR 112 are not active at the same time. Logic OR 116 receives RO 164 and RO 149 and generates RO 126 which comprises the data transmitted by far end SBIDI driver 193.

SBIDI receiver 107 has a receiver positive input (RPI) 150 and a receiver negative input (RNI) 151 and generates RO 165 in response to the difference in its inputs RPI 150 and RNI 151. RPI 150 is generated in summing circuit 109 as the summation of DPO 181 and RNO 143. Similarly RNI 151 is generated in summing circuit 111 as the summation of DNO 183 and RPO 142. Therefore, the voltage at RPI 150 is equal to (DPO 181+RNO 143) and the voltage at the RNI 151 is equal to (DNO 183+RPO 143). SBIDI receiver 107 then generates RO 165 proportional to [(DPO 181–DNO 183)–(RPO 142–RNO 143)]. Since the portion of (DPO 181–DNO 183) attributed to the far end SBIDI driver 103 is essentially equal to (RPO 142–RNO 143), RO 165 is substantially only a function of the signal attributed to near end SBIDI driver 182.

DPO 181 and DPN 183 are also coupled to RPI 152 and RNI 153, respectively, of UR 113 which generates RO 154 as the amplified difference between RPI 152 and RNI 153. UR 113 is enabled by RE 129 which is the logic combination of DE 123 and RE 125 generated by logic NOR 115. The enable circuitry is configured so SBIDI receiver 107 and UR 113 are not active at the same time. Logic OR 117 receives RO 165 and RO 154 and generates RO 127 which comprises the data transmitted by near end SBIDI driver 182.

Figure 2:
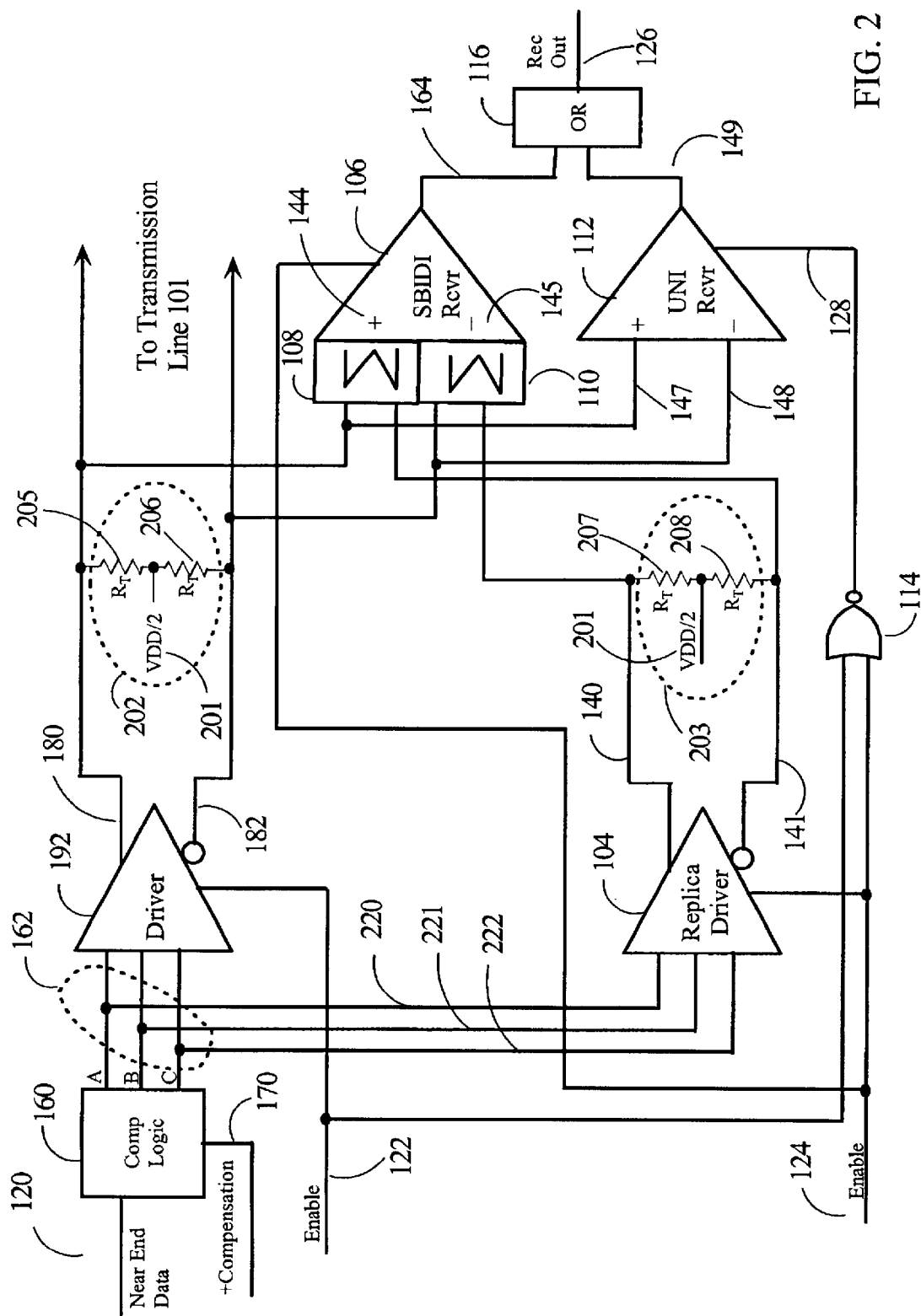
FIG. 2 is a more detailed circuit diagram of the combination UNI and SBIDI circuitry according to embodiments of the present invention.

FIG. 2 is a more detailed circuit diagram of the near end circuitry of FIG. 1 showing the termination circuits used on SBID driver 192 and RD 104. The corresponding detailed circuit diagram of far end circuitry, which is substantially identical to the near end circuitry in FIG. 2, is omitted to simplify the explanation of the present invention. Near end data 120 is received in logic 160 which generates driver data 162. Driver data 162 comprises Data A 220, Data B 221 and Data C 222. The states of Data A 220, Data B 221 and Data C 222 depend on the logic state of mode compensation signal 170. Signals Data A 220, Data B 221 and Data C 222 are explained in more detail relative to FIG. 3. Data A 220, Data B 221 and Data C 222 are also coupled to the inputs of RD 104. DPO 180 and DNO 182 are coupled to near end terminator network (TN) 202. TN 202 is a series connection of resistors RT 205 and RT 206. The common node of RT 205 and RT 206 is coupled to one half of the power supply voltage (VDD/2) for the SBIDI drivers 102 and 103. RPO 140 and RNO 141 are also coupled to a replica near end TN 203. TN 203 is a series connection of resistors RT 207 and RT 208. The common node of RT 207 and RT 208 is also coupled to VDD/2. This insures that SBIDI driver 192 and RD 104 experience the equivalent impedance at their respective outputs. Summation circuit 108 receives DPO 180 and RNO 141 and generates RPI 144 while summation circuit 110 receives DNO 182 and RPO 140 and generates RNI 145. UN 112 receives RPI 147 and RNI 148 and generates RO 149. RO 164 and RO 149 are logic OR'ed in logic gate 116 to generate RO 126 which comprises data transmitted by a SBIDI far end driver (e.g., SBIDI driver 193). DE 122 is used to set DPO 180 and DPO 182 in a high impedance state when the near end circuits are operating in the UNI mode and the near end circuits are receiving data. Likewise, RE 124 insures that RD 104 and SBIDI receiver 106 are gated OFF when UR 112 is enabled in the UNI mode by RE 128 which is the logic combination of DE 122 and RE 124 generated by logic NOR 114.

Figure 3:
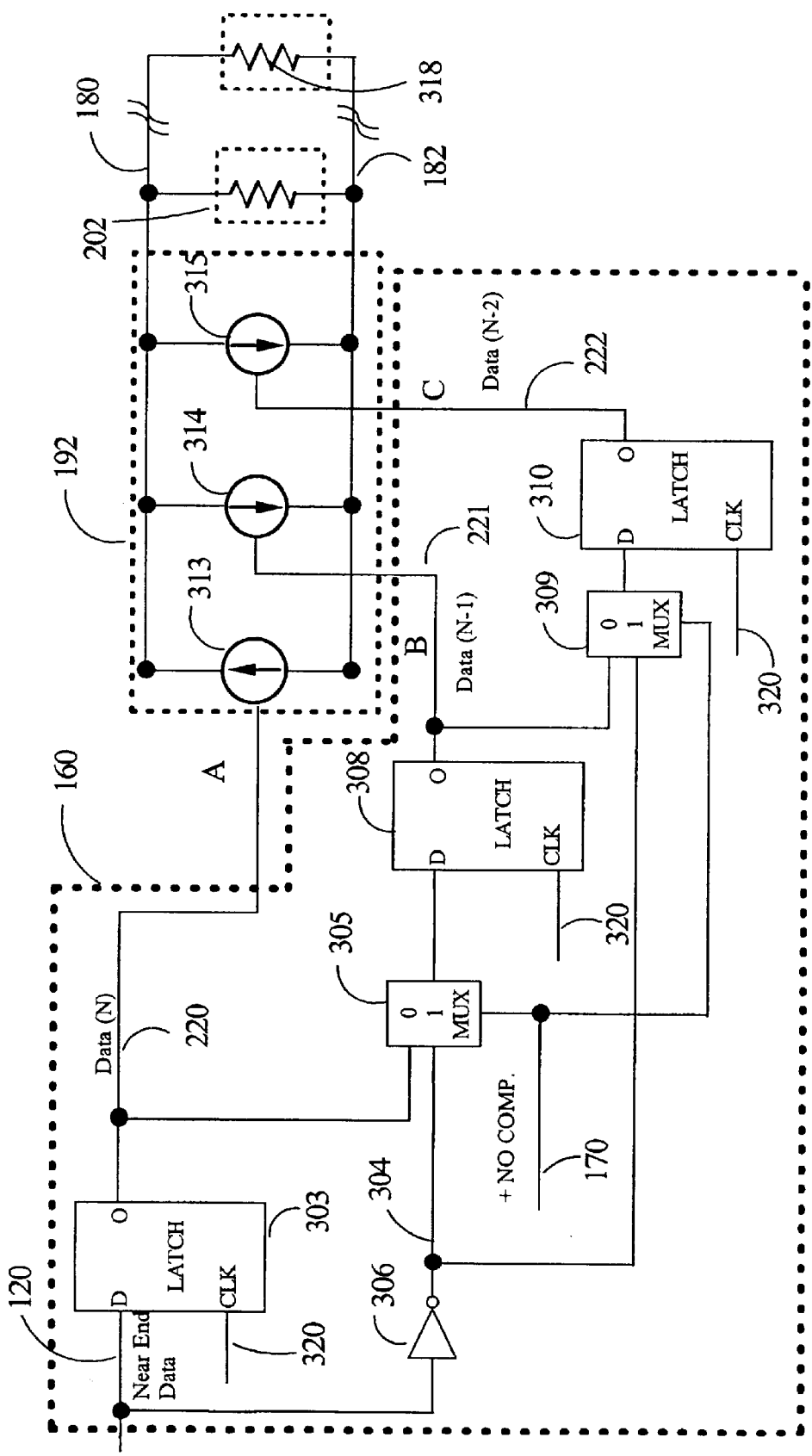
FIG. 3 is a circuit diagram of logic gating multiple current sources within an SBIDI driver.

FIG. 3 is a more detailed circuit diagram of near end circuits, compensation logic 160 and SBIDI driver 192. It is understood that far end circuits, compensation logic 161 and SBIDI driver 193, are substantially the same as logic 160 and SBIDI driver 192. In one embodiment of the present invention, SBIDI driver 192 comprises three current sources, CS 313, CS 314 and CS 315. It is understood that a different number of current sources may be used for SBIDI drivers 192 and 193 and still be within the scope of the present invention. CS 313, CS 314 and CS 315 are controlled by the logic states of inputs Data A 220, Data B 221 and Data C 222, respectively. The magnitude of the current in the current sources is not dependent on the inputs Data A 220, Data B 221 and Data C 222; however, the polarity of the current is dependent on the logic states. For example, CS 313 is shown with its current source arrow pointing vertically up which indicates that when Data A 220 is a logic one CS 313 "sources" current and current flow is towards far end terminator network 318. CS 314 is shown with its current source arrow pointing vertically down which indicates that when Data B 221 is a logic one CS 314 "sinks" current and current flow is in the opposite direction as CS 313. In this way, when Data A 220 and Data B 221 are both a logic one, the resulting current level is the difference in CS 313 and CS 314. This allows for different operation modes for SBIDI driver 192 (also SBIDI driver 193).

Near end data 120 is inverted by inverter 306 and coupled to 2x 1 multiplexers (MUXs) 305 and 309 as inverted Data (ID) 304. MUX 305 and MUX 309 are controlled by compensation logic signal (CP) 170. For example, MUX 305 has ID 304 connected to the "1" input and Data A 220 connected to the "0" input. This means that when mode compensation signal 170 is a logic one (no compensation), ID 304 is coupled to the input of latch (L) 308 and when CP 170 is a logic zero (enable compensation), Data A 220 is coupled to the input of L 308. Latches 303, 308 and 310 employ a clock signal 320 which corresponds to the data rate of near end data 120.

Near end data 120 is delayed by L 303 to generate Data A 220. If CP 170 is a logic one, Data A 220 is the same phase as near end data 120 and delayed by L 303. Likewise, Data B 221 and Data C 222 are the opposite phase as near end data 120 and delayed the same amount by L 308 and L 310, respectively. In this mode, Data B 221 and Data C 222 are the same signal as Data A 220 but of opposite phase (inverted). Corresponding current sources CS 314 and CS 315 are controlled by Data B 221 and Data C 222, respectively, and deliver current opposite of CS 313 for like phase inputs. Therefore, CS 313, CS 314 and CS 315 all add when CP 170 is a logic one (no compensation). When CP 170 is a logic zero, the input to L 308 is Data A 220 and corresponds to Data 120 delayed one clock cycle. Data A 220 is the reference data signal or Data (N), where "N" indicates a present data time. Data B 221 is Data A 220 delayed one clock cycle by L 308 or Data (N−1), where "N−1" indicates one clock cycle previous to "N". In the same manner, the input to L 310 is Data B 221 and Data C 222 is Data A 220 delayed two clock cycles or Data (N−2). Therefore, when L 170 is a logic zero (compensation active) the current level of SBIDI 102 depends on the present logic state of Data A 220 and its logic states on the previous two clock cycles. Compensation is useful in the SBIDI mode to correct for losses in the transmitted signals.

Figure 4:
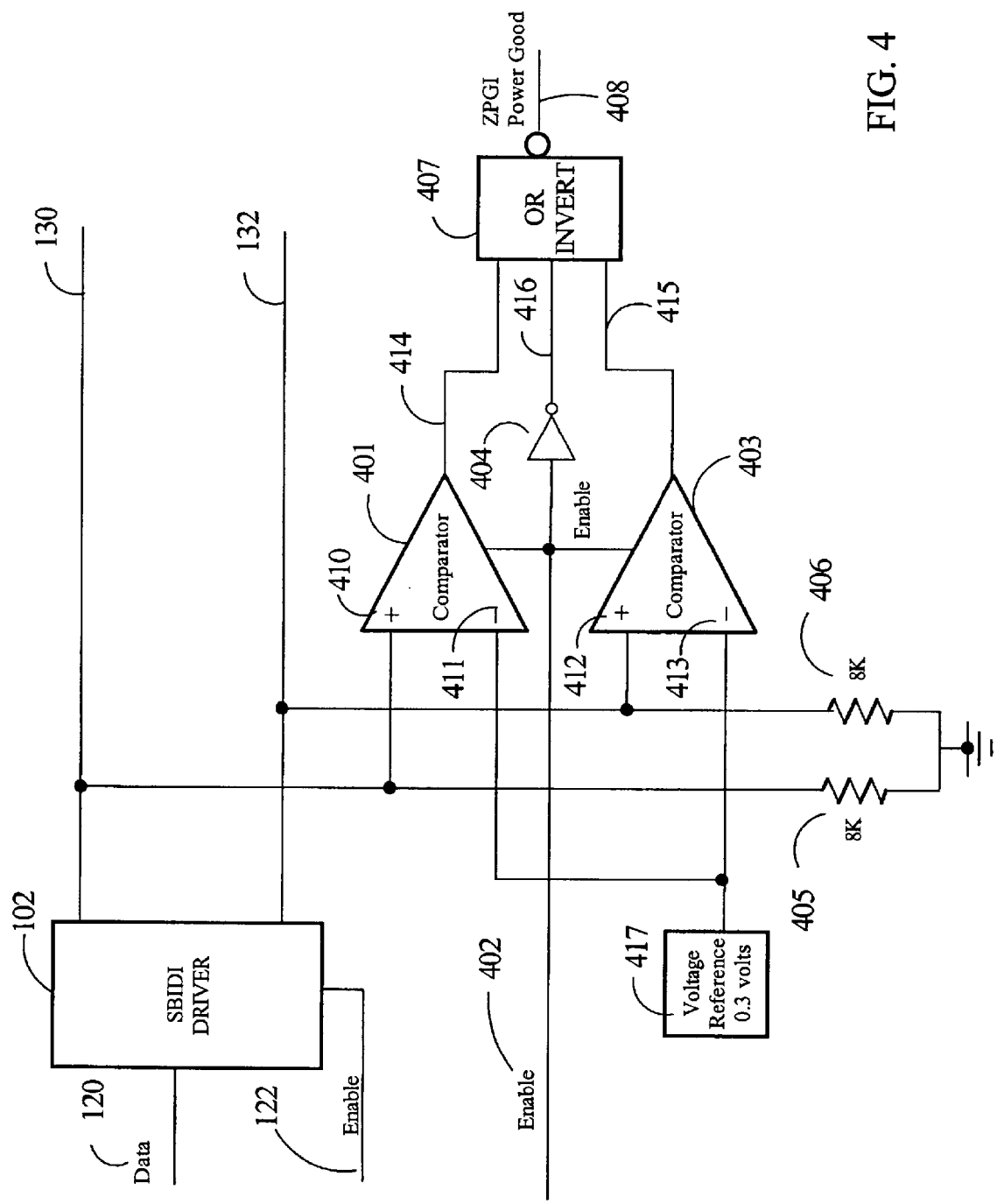
FIG. 4 is a circuit diagram of circuits used to determine if an off-chip network with an SBIDI driver is coupled to circuitry at the far end.

FIG. 4 is a circuit diagram of additional circuits used in embodiments of the present invention. SBIDI driver 102 has DPO 130 and DNO 131 coupled to pull down resistors 405 and 406. Comparators 401 and 403 have negative comparator inputs (NCI) 411 and NCI 413 coupled to voltage reference 417 and positive comparator inputs (PCI) 410 and PCI 412 coupled to DPO 130 and DNO 131, respectively. Enable 402 is coupled to comparators 401 and 403 and it is inverted by inverter 404 generating signal 416 coupled to an input of logic OR Invert (ORI) 407. Comparator outputs 414 and 415 are also coupled to inputs of ORI 407. If SBIDI driver 102 is tri-stated (high impedance for unidirectional mode on DPO 130 and DNO 131) and a transmission line is disconnected, power good signal ZPGI 408 transitions to a logic one. If a driver is active at the far end, one of DPO 130 or DNO 132 will be driven high and either comparator 401 or 403 will cause ZPGI to go to a logic zero. This may be useful in the unidirectional mode to determine if a given transmission line is connected. The circuit is disabled in the SBIDI mode.

Figure 5:
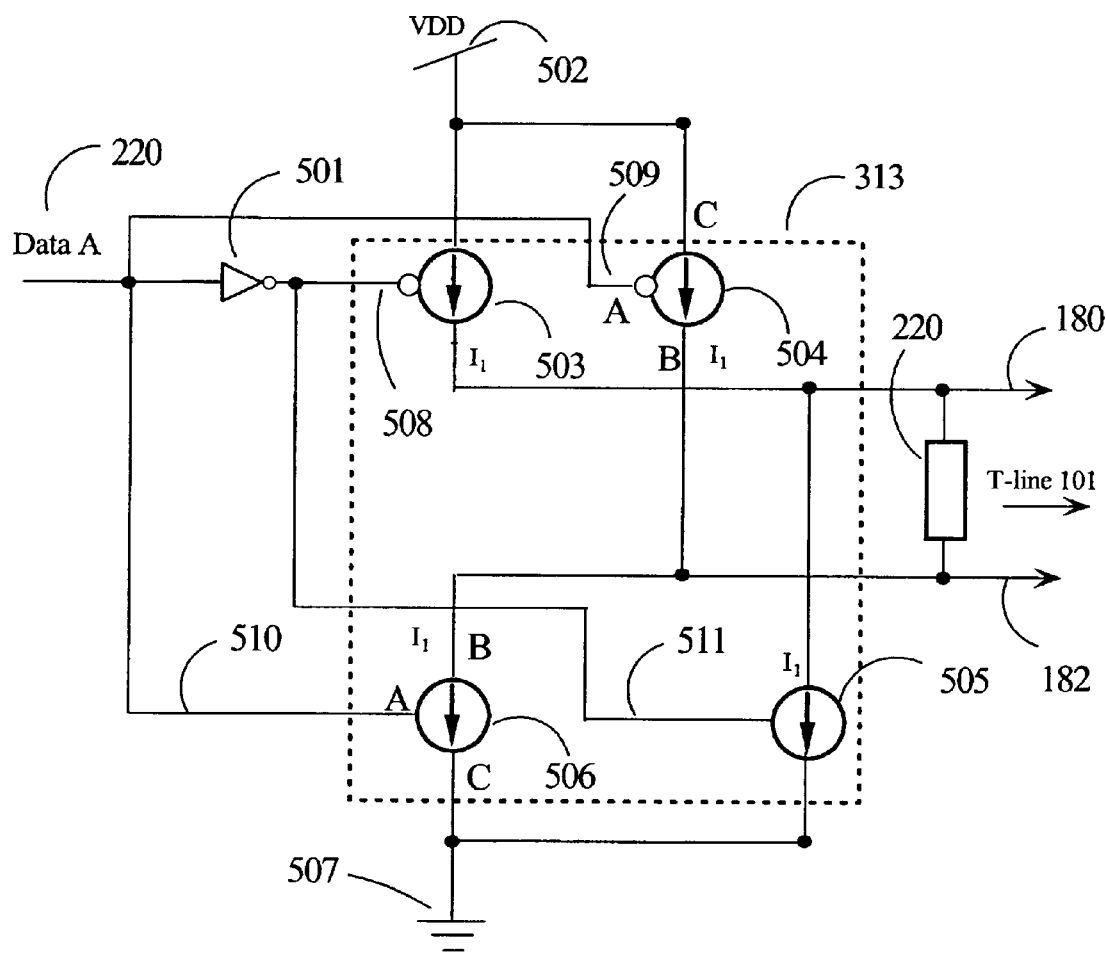
FIG. 5 is a diagram of the multiple current sources coupled to a split near end termination resistor network.

FIG. 5 is a detailed circuit diagram illustrating a configuration for current sources used in the SBIDI drivers (e.g., SBIDI driver 192) of the present invention. CS 313 is an exemplary current source used in SBIDI driver 192. CS 313 comprises four gated current sources (GCS) 503, GCS 504, GCS 505, and GCS 506 connected in an "H" topology for driving transmission line 101 in a differential mode. GCS 503 and CS 506 drive current in one direction and GCS 504 and GCS 505 drive current in the opposing direction through transmission line 101. GCS 503 and GCS 504 are "negative" gated current sources and are turned ON when their inputs 508 and 509 are at a logic zero. Likewise, GCS 505 and GCS 506 are "positive" gated current sources and are turned ON when their inputs 510 and 511 are a logic one. Exemplary input Data A 220 is coupled directly to input 509 and 510, its logic inversion is coupled to input 508 and 511, respectively. If Data A 220 is a logic one, current is sourced from DPO 180 and returned to DNO 182. When Data A 220 is a logic zero, current is sourced from DNO 182 and returned to DPO 180, thus the direction of current flow from a current source in SBIDI driver 192 is dependent on the logic state of the data inputs (e.g., Data A 220).

Figure 6A:
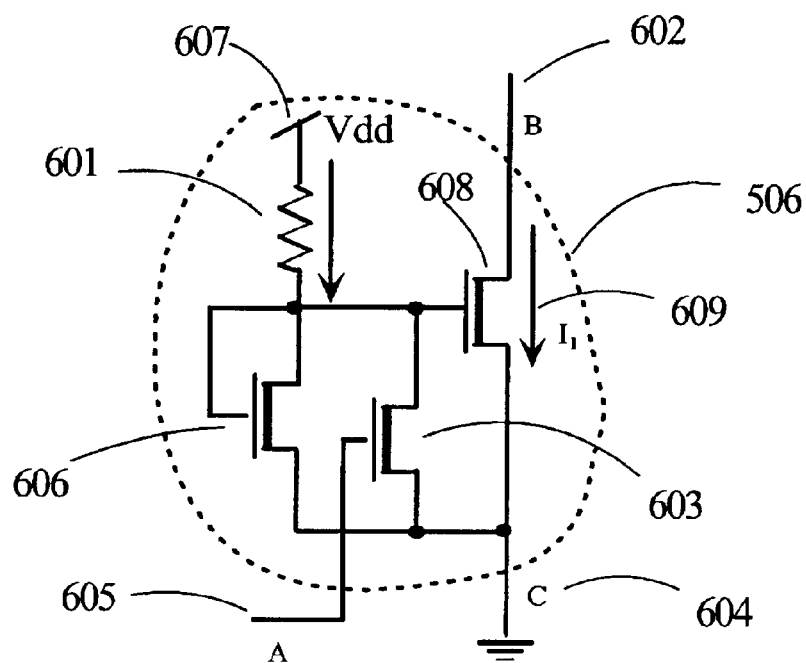
FIGS. 6A and 6B are circuit diagrams of current source topologies usable with embodiments of the present invention.
Figure 6B:
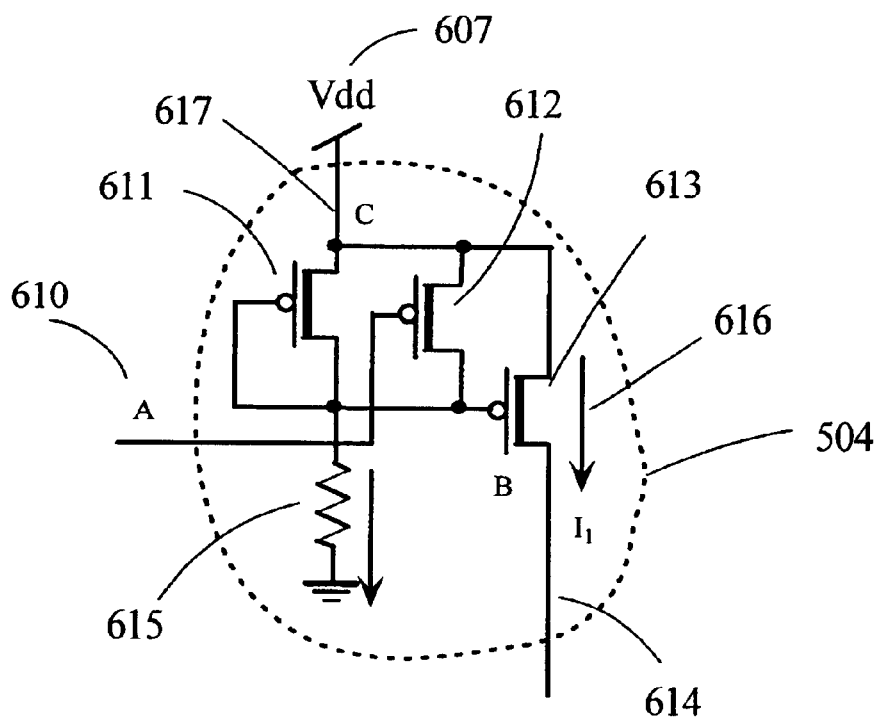

FIG. 6A and FIG. 6B are detailed circuit diagrams of topologies for exemplary for gated current sources for implementing GCS 506 and GCS 504, respectively. In FIG. 6A, GCS 506 comprises the N-channel field effect transistors (NFETS) 603, 606 and 608. NFET 606 is part of a current mirror with its gate terminal connected to its drain terminal. The voltage across NFET 606 is equal to its gate to source turn-on voltage determined primarily by its device parameters, resistor 601 and power supply voltage 607. Since NFET 606 and NFET 608 have the same gate to source voltage, they will have essentially the same drain current if they are the same size devices. NFET 608 is operating as a current "sink" which will sink current 609 to node C 604 relatively independent of the voltage of node B 602. NFET 603 is connected across the gate to source of NFET 608 and serves to shunt the current through resistor 601 around NFET 606 when NFET 603 is turned ON. NFET 603 is turned ON by a logic one on node A 605, which in turn gates OFF GCS 506. In this topology, exemplary GCS 506 turns ON with a logic zero and turns OFF with a logic one.

In FIG. 6B, exemplary GCS 504 comprises the P-channel FET (PFET). PFET 611 is part of a current mirror with its gate terminal connected to its drain terminal. The voltage across PFET 611 is its gate to source turn-on voltage determined primarily by its device parameters and resistor 615 and power supply voltage 607. Since PFET 611 and PFET 613 have the same gate to source voltage, they will have essentially the same drain current if they are the same size devices. PFET 613 is operating as a current "source" which will source current 616 from node C 617 relatively independent of the voltage on node B 614. PFET 612 is connected across the gate to source of PFET 613 and serves to shunt the current through resistor 615 and around PFET 611 when PFET 612 is turned ON. PFET 612 is turned ON by a logic zero on node A 610, which in turn turns OFF exemplary GCS 504. In this topology, GCS 504 turns OFF with a logic zero and turns ON with a logic one. It is understood by those skilled in the arts that other topologies are possible for exemplary GCS 504 and GCS 506.

Although the present invention and its advantages have been described in detail, it should be understood that various changes, substitutions and alterations can be made herein without departing from the spirit and scope of the invention as defined by the appended claims.

What is claimed is:

1. A system for selectively communicating data bi-directionally between a near end and a far end of a transmission line, said system comprising:

a first driver, said first driver receiving a near end data signal, a first driver enable signal, and a first mode compensation signal and generating a first driver output, said first driver output coupled to first and second line inputs of said near end of said transmission line, said first driver output driving said transmission line with a selected current level responsive to said near end data signal and said first mode compensation signal;

a first receiver circuit coupled to said first and second line inputs and generating a first near end receiver output by detecting a far end signal from within a composite signal when said first driver is enabled;

a second receiver circuit coupled to said first and second line inputs of said near end of said transmission line and generating a second near end receiver output by detecting said far end signal when said first driver is disabled; and a first logic circuit receiving said first near end receiver output and said second near end receiver output and generating a far end data signal.

2. The system of claim 1, wherein said selected current level is set to a first current level when said mode compensation signal has a first logic state and a second current level when said first mode compensation signal has a second logic state, said first logic state of said first mode compensation signal corresponding to a simultaneous bi-directional transmission mode and said second logic state corresponding to a unidirectional transmission mode.

3. The system of claim 1, wherein said first driver receives a plurality of driver data signals and generates said first driver output with said selected current level, said selected current level set in response to said plurality of driver data signals and said first mode compensation signal; said plurality of data signals generated by a second logic circuit receiving said near end data signal and said first mode compensation signal.

4. The system of claim 3, wherein said first mode compensation signal has a first logic state corresponding to a simultaneous bi-directional transmission mode and a second logic state corresponding to a unidirectional transmission mode.

5. The system of claim 3, wherein said first driver comprises a plurality of current sources coupled to said first and second line inputs, said selected current level generated by a summation of said plurality of current sources at said near end of said transmission line, each of said plurality of current sources receiving one of said plurality of driver data signals.

6. The system of claim 5, wherein a polarity of each of said plurality of current sources is determined by a logic state of a corresponding one of said plurality of driver data signals.

7. The system of claim 6, wherein said second logic circuit comprises:

a first latch receiving said near end data signal and generating said near end data signal delayed one input/output clock cycle as a first driver data signal of said plurality of driver data signals;

a second latch selectively receiving said first driver data signal or a logic inversion of said near end data signal in response to said first mode compensation signal and generating a second driver data signal of said plurality of driver data signals; and a third latch selectively receiving said second driver data signal or said logic inversion of said near end data signal in response to said first mode compensation signal and generating a third driver data signal of said plurality of driver data signals.

8. The system of claim 1, wherein said first receiver circuit comprises:

a first differential comparator with a receiver positive input, a receiver negative input, said first differential comparator generating a first receiver output in response to a difference voltage between said receiver positive and said receiver negative input;

a first replica driver receiving said near end data signal, a receiver enable signal, and generating a differential replica output at a first replica node and second replica node, said first replica node and said second replica node coupled to a replica termination network, said differential replica output generating a signal substantially equal to said near end signal;

a first summing circuit receiving said first input and said second replica node and generating a first summing output, said first summing output coupled to said positive receiver input; and a second summing circuit receiving said second input and said first replica node and generating a second summing output, said second summing output coupled to said negative receiver input.

9. The system of claim 1, wherein said second receiver circuit comprises:
a second differential comparator with a comparator positive input and a comparator negative input and generating said second near end receiver output, said comparator positive input coupled to said first input and said comparator negative input coupled to said second input.

10. The system of claim 1, further comprising:
a second driver, said second driver receiving a far end data signal, a second driver enable signal, and a second mode compensation signal and generating a second driver output, said second driver output coupled to third and fourth line inputs of said far end of said transmission line, said second driver output driving said transmission line with a selected current level responsive to said far end data signal and said second mode compensation signal;
a third receiver circuit coupled to said third and fourth line inputs and generating a first far end receiver output by detecting a near end signal from within a composite signal when said second driver is enabled;
a fourth receiver circuit coupled to said third and fourth line inputs of said far end of said transmission line and generating a second far end receiver output by detecting said near end signal when said second driver is disabled; and
a first logic circuit receiving said first far end receiver output and said second far end receiver output and generating said near end data signal.

11. The system of claim 10, wherein said selected current level is set to a first current level when said second mode compensation signal has a first logic state and a second current level when said second mode compensation signal has a second logic state, said first logic state of said second mode compensation signal corresponding to a simultaneous bi-directional transmission mode and said second logic state of said second mode compensation signal corresponding to a unidirectional transmission mode.

12. The system of claim 10, wherein said second driver receives a plurality of driver data signals and generates said second driver output with said selected current level, said selected current level set in response to said plurality driver data signals and said second mode compensation signal; said plurality of data signals generated by a third logic circuit receiving said far end data signal and said second mode compensation signal.

13. The system of claim 12, wherein said second mode compensation signal has a first logic state corresponding to a simultaneous bi-directional transmission mode and a second logic state corresponding to a unidirectional transmission mode.

14. An integrated circuit (IC) having an input/output (I/O) circuit for transmitting and receiving data between a near end and a far end of said transmission line, said I/O circuit having;
a first driver, said first driver receiving a near end data signal, a first driver enable signal, and a mode compensation signal and generating a first driver output, said first driver output coupled to first and second line inputs of said near end of said transmission line, said first driver output driving said transmission line with a selected current level responsive to said near end data signal and said mode compensation signal;
a first receiver circuit coupled to said first and second line inputs and generating a first near end receiver output by detecting a far end signal from within a composite signal when said first driver is enabled;
a second receiver circuit coupled to said first and second line inputs of said near end of said transmission line and generating a second near end receiver output by detecting said far end signal when said first driver is disabled; and
a first logic circuit receiving said first near end receiver output and said second near end receiver output and generating a far end data signal.

15. The IC of claim 14, wherein said selected current level is set to a first current level when said mode compensation signal has a first logic state and a second current level when said mode compensation signal has a second logic state, said first logic state of said mode compensation signal corresponding to a simultaneous bi-directional transmission mode and said second logic state corresponding to a unidirectional transmission mode.

16. The IC of claim 14, wherein said first driver receives a plurality of driver data signals and generates said first driver output with said selected current level, said selected current level set in response to said plurality of driver data signals and said mode compensation signal; said plurality of data signals generated by a second logic circuit receiving said near end data signal and said mode compensation signal.

17. The IC of claim 16, wherein said mode compensation signal has a first logic state corresponding to a simultaneous bi-directional transmission mode and said second logic state corresponding to a unidirectional transmission mode.

18. The IC of claim 16, wherein said first driver comprises a plurality of current sources coupled to said first and second line inputs, said selected current level generated by a summation of said plurality of current sources at said near end of said transmission line, each of said plurality of current sources receiving one of said plurality of driver data signals.

19. The IC of claim 18, wherein a polarity of each of said plurality of current sources is determined by a logic state of a corresponding one of said plurality of driver data signals.

20. The IC of claim 19, wherein said second logic circuit comprises:
a first latch receiving said near end data signal and generating said near end data signal delayed one input/output clock cycle as a first driver data signal of said plurality of driver data signals;
a second latch selectively receiving said first driver data signal or a logic inversion of said near end data signal in response to said mode compensation signal and generating a second driver data signal of said plurality of driver data signals; and
a third latch selectively receiving said second driver data signal or said logic inversion of said near end data signal in response to said mode compensation signal and generating a third driver data signal of said plurality of driver data signals.

21. The IC of claim 14, wherein said first receiver circuit comprises:
a first differential comparator with a receiver positive input, a receiver negative input, said first differential comparator generating a first receiver output in response to a difference voltage between said receiver positive and said receiver negative input;
a first replica driver receiving said near end data signal, a receiver enable signal, and generating a differential replica output at a first replica node and second replica node, said first replica node and said second replica node coupled to a replica termination network, said differential replica output generating a signal substantially equal to said near end signal;

a first summing circuit receiving said first input and said second replica node and generating a first summing output, said first summing output coupled to said positive receiver input; and a second summing circuit receiving said second input and said first replica node and generating a second summing output, said second summing output coupled to said negative receiver input.

22. The IC of claim 14, wherein said second receiver circuit comprises:

a second differential comparator with a comparator positive input and a comparator negative input and generating said second near end receiver output, said comparator positive input coupled to said first input and said comparator negative input coupled to said second input.

* * * * *